(12) United States Patent
Shang (10) Patent No.: US 11,947,608 B2
(45) Date of Patent: Apr. 2, 2024

(54) SEARCH TERM RECOMMENDATION METHOD AND SYSTEM BASED ON MULTI-BRANCH TREE

(71) Applicant: SHENZHEN SEKORM COMPONENT NETWORK CO., LTD, Guangdong (CN)

(72) Inventor: Lianglei Shang, Guangdong (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 241 days.

(21) Appl. No.: 17/467,268

(22) Filed: Sep. 5, 2021

(65) Prior Publication Data
US 2021/0397667 A1    Dec. 23, 2021

Related U.S. Application Data

(63) Continuation of application No. PCT/CN2020/090647, filed on May 15, 2020.

(51) Int. Cl.
*G06F 16/9535* (2019.01)
*G06F 16/9532* (2019.01)
(Continued)

(52) U.S. Cl.
CPC ...... *G06F 16/9535* (2019.01); *G06F 16/9532* (2019.01); *G06F 16/9538* (2019.01); *G06N 5/048* (2013.01)

(58) Field of Classification Search
CPC ............. G06F 16/9535; G06F 16/9532; G06F 16/9538
See application file for complete search history.

(56) References Cited

U.S. PATENT DOCUMENTS

| 7,676,462 B2 * | 3/2010 | Kirkland | G06F 16/3322 |
| | | | 707/999.005 |
| 8,583,675 B1 * | 11/2013 | Haahr | G06F 16/3322 |
| | | | 707/723 |

(Continued)

FOREIGN PATENT DOCUMENTS

| CN | 102682090 A | 9/2012 |
| CN | 102768681 A | 11/2012 |

(Continued)

OTHER PUBLICATIONS

Search Report of CN patent application No. 2020104151909 dated Nov. 10, 2023.

*Primary Examiner* — Mark E Hershley
(74) *Attorney, Agent, or Firm* — Andrew C. Cheng (57) ABSTRACT

The invention relates to a search term recommendation method and system based on a multi-branch tree. The method comprise that steps that: A, a multi-branch tree term chain data generation process: splitting each hot term into a plurality of independent words, generating a term chain according to the sequence of the words from first to last in the hot term, each word is a node in the term chain, and nodes corresponding to the same word in different term chains are used as public nodes to generate multi-branch tree term chain data; B, a search term recommendation process: searching multi-branch tree term chain data accord to that currently input terms, taking a term chain that matches the inputted words as a recommended term.

18 Claims, 3 Drawing Sheets

(51) Int. Cl.
  *G06F 16/9538* (2019.01)
  *G06N 5/048* (2023.01)

(56) References Cited

U.S. PATENT DOCUMENTS

| | | | | |
|---|---|---|---|---|
| 9,305,114 | B2* | 4/2016 | Yuen | G06F 16/3322 |
| 9,563,692 | B1* | 2/2017 | Haahr | G06F 16/313 |
| 10,268,646 | B2* | 4/2019 | Jaech | G06F 16/9535 |
| 11,574,012 | B2* | 2/2023 | Hu | G06F 16/90324 |
| 2002/0194223 | A1* | 12/2002 | Meyers | G06F 40/211 |
| | | | | 715/234 |
| 2009/0171869 | A1* | 7/2009 | Liu | G06F 16/24578 |
| | | | | 706/12 |
| 2009/0253112 | A1* | 10/2009 | Cao | G06F 16/3329 |
| | | | | 434/322 |
| 2009/0319518 | A1* | 12/2009 | Koudas | G06F 16/338 |
| | | | | 707/999.005 |
| 2010/0030769 | A1* | 2/2010 | Cao | G06F 16/338 |
| | | | | 707/738 |
| 2010/0306249 | A1* | 12/2010 | Hill | G06F 16/9535 |
| | | | | 707/769 |
| 2010/0318536 | A1* | 12/2010 | Bandholz | G06F 16/2425 |
| | | | | 704/251 |
| 2011/0065082 | A1* | 3/2011 | Gal | G09B 7/02 |
| | | | | 434/365 |
| 2012/0117048 | A1* | 5/2012 | Rosenoff | G06Q 50/18 |
| | | | | 707/706 |
| 2012/0254197 | A1* | 10/2012 | Kuzmin | G06F 3/04886 |
| | | | | 707/751 |
| 2012/0284258 | A1* | 11/2012 | Liu | G06F 16/2246 |
| | | | | 707/E17.014 |
| 2012/0290950 | A1* | 11/2012 | Rapaport | H04L 12/1818 |
| | | | | 715/753 |
| 2013/0246337 | A1* | 9/2013 | Ahuja | G06F 16/374 |
| | | | | 707/E17.014 |
| 2013/0262485 | A1* | 10/2013 | Li | G06F 16/335 |
| | | | | 707/754 |
| 2014/0337371 | A1* | 11/2014 | Li | G06F 16/243 |
| | | | | 707/767 |
| 2015/0012519 | A1* | 1/2015 | He | G06F 16/90324 |
| | | | | 707/706 |
| 2015/0339384 | A1* | 11/2015 | Hu | G06F 16/322 |
| | | | | 707/722 |
| 2016/0063093 | A1* | 3/2016 | Boucher | G06F 16/3322 |
| | | | | 707/748 |
| 2016/0085853 | A1* | 3/2016 | Zelevinsky | G06F 16/338 |
| | | | | 707/765 |
| 2016/0179953 | A1* | 6/2016 | Klotz, Jr | G06F 16/242 |
| | | | | 707/722 |
| 2016/0373456 | A1* | 12/2016 | Vermeulen | G06F 16/3322 |
| 2018/0150551 | A1* | 5/2018 | Wang | G06F 16/338 |
| 2018/0300407 | A1* | 10/2018 | Wolny | G06Q 50/01 |
| 2019/0102482 | A1* | 4/2019 | Ni | G06F 16/90332 |
| 2019/0384762 | A1* | 12/2019 | Hill | G06F 16/2272 |
| 2021/0232376 | A1* | 7/2021 | Wang | G06N 20/00 |
| 2021/0397667 | A1* | 12/2021 | Shang | G06N 5/04 |

FOREIGN PATENT DOCUMENTS

| | | |
|---|---|---|
| CN | 104331434 A | 2/2015 |
| CN | 105955986 A | 9/2016 |
| CN | 106934006 A | 7/2017 |
| CN | 107665217 A | 2/2018 |
| CN | 107992481 A | 5/2018 |
| CN | 108694186 A | 10/2018 |
| CN | 109753648 A | 5/2019 |
| CN | 110851722 A | 2/2020 |

\* cited by examiner

SEARCH TERM RECOMMENDATION METHOD AND SYSTEM BASED ON MULTI-BRANCH TREE

CROSS REFERENCE TO RELATED APPLICATIONS

The present application is a Continuation Application of PCT Application No. PCT/CN2020/090647 filed on May 15, 2020, the contents of which are incorporated herein by reference in their entirety.

BACKGROUND OF THE INVENTION

1. Technical Field

The invention relates to the field of search engine search term recommendation, in particular to a search term recommendation method and system based on multi-branch tree.

2. Description of Related Art

When people use the search engine, they will input the terms to be searched, the search engine will display a number of recommended terms according to the words input by the user, and the user can choose to reduce the amount of text input by the user. In the prior art, a right fuzzy matching algorithm is used for providing recommended terms, after a user inputs words in a search engine, the input words are used for scanning a disk, and the recommended hot terms, such as the top ten recommended hot terms, are returned. However, this right fuzzy matching algorithm has the following defects: the number of right fuzzy matching is strictly limited, for example, in the case of more than 100 W rows of data, heavy use of right fuzzy matching will lead to computer disk read bottlenecks, occupy the server IO storage. Instant upgrade of SSD solid state hard disk cannot solve the root cause of the problem, expensive SSD solid state upgrade can only improve the response speed of less than 20%, when the access volume is large, it will still occupy full disk read and write TO.

BRIEF SUMMARY OF THE INVENTION

The technical problem to be solved by the invention is to provide a search term recommendation method and system based on a multi-branch tree aiming at the defects of the prior art.

The technical proposal adopted by the invention to solve the technical problem is to construct a search term recommendation method based on a multi-branch tree, which comprises the following steps:

A, a multi-branch tree term chain data generation process: splitting each hot term into a plurality of independent words, generating a term chain according to the sequence of the words from first to last in the hot term, each word is a node in the term chain, and nodes corresponding to the same words in different term chains are used as public nodes to generate the multi-branch tree term chain data;

and B, a search term recommendation process: searching the multi-branch tree term chain data according to the currently inputted words, and taking the term chain matched with the inputted words as a recommended term.

Further, in the search term recommendation method based on the multi-branch tree of the present invention, the searching for the multi-branch tree term chain data according to the currently inputted words comprises:

B1, extracting the first word of the inputted words, and searching a node matched with the first word in the multi-branch tree term chain data;

B2, matching the remaining words of the inputted words with the branch nodes of the first word matching node one by one in sequence;

and B3, after all that inputted words are matched, continuously reading the residual nodes of the term chain where all the nodes corresponding to the inputted words are located.

Further, in the search term recommendation method based on the multi-branch tree of the present invention, the step of continuing to read the remaining nodes of the term chain where all the nodes corresponding to the inputted words are located comprises:

continuing to read that remaining nodes of the term chain where all the nodes corresponding to the inputted words are located until an end node is encountered, wherein the end node is a node corresponding to an end word of each hot term in the multi-branch tree term chain data generation process.

Further, in the search term recommendation method based on the multi-branch tree of the present invention, the step of taking the term chain matched with the inputted words as a recommendation term comprises:

taking that term chain with the least number of nodes in all term chains where all the nodes corresponding to the inputted words are positioned as the recommended term.

Further, in the search term recommendation method based on the multi-branch tree of the present invention, the step of taking that term chain with the least number of nodes among all term chains where all nodes corresponding to the inputted words are located as a recommendation term comprises:

combining that words correspond to all the nodes in the term chain with the least number of nodes in all the term chain where all the nodes corresponding to the inputted words are located into the recommended terms according to the matching sequence from first to last.

Further, in the search term recommendation method based on the multi-branch tree of the present invention, in the process of generating the multi-branch tree term chain data, dividing the multi-branches tree term chain data into a plurality of multi-branches tree term chain sub-data according to the attribute information of the hot term;

and that step of searching the multi-branch tree term chain data according to the current inputted words comprises the following steps: selecting corresponding multi-branch tree term chain sub-data according to the attribute information of the first word of the inputted words, and searching the selected multi-branches tree term chain sub-data according to current inputted words.

Furthermore, the search term recommendation method based on the multi-branch tree of the present invention further comprises:

C, a multi-branch tree term chain data update process: splitting each updated hot term into a plurality of independent words, generating an updated term chain accord to that sequence of the words from first to last in the updated hot term, wherein each word is a node in the updated term chain, carrying out the same node fusion on each node in the updated term chain and the existing multi-branch tree term chain data, and updating the multi-branch tree term chain data.

Further, in the search term recommendation method based on the multi-branch tree of the present invention, in the multi-branch tree term chain data updating process:

if the hot term node module comprises a plurality of hot term node sub-modules, the corresponding update term chain is updated to the multi-branch tree term chain sub-data of the corresponding attribute according to the attribute information of the update hot term.

Furthermore, in the search term recommendation method based on the multi-branch tree of the invention, the words are Chinese characters, and the attribute information is the order of the first letters of Chinese Pinyin corresponding to the characters.

Furthermore, in the search term recommendation method based on the multi-branch tree, the words are one or more of Chinese characters, foreign words and Arabic numerals.

In addition, the invention also provides a search term recommendation system based on a multi-branch tree, which comprises a search engine hot term recommendation module, a hot term query server, a hot term loading server and a plurality of hot term data sources; the search engine hot term recommendation module is installed on a search engine of a user terminal, and the hot term query server comprises a user gateway proxy service module and a hot term node module;

the search engine hot term recommendation module is in communication connection with the user gateway proxy service module, the user gateway proxy service module is in communication connection with the hot term node module which is in communication connection with the hot term loading server; the hot term loading server is in communication connection with each hot term data source;

the hot term loading server receives all the hot terms sent by the hot term data source and sends the hot terms to the hot term node module for storage, the hot term node module splits each hot term into a plurality of independent words, a term chain is generated according to the order of the words from first to last in the hot term, each word is a node in the term chain, nodes corresponding to the same words in different term chains are taken as public nodes to generate multi-branch tree term chain data;

the search engine hot term recommending module is used for receiving words input by a user and sending the inputted words to the user gateway agent service module, the user gateway agent service module sends the input words to the hot term node module, the hot term node module searches the multi-branch tree term chain data according to the input words, taking a term chain matched with the input words as a recommended term;

and the hot term node module sends the recommended term obtained by query to the search engine of the user terminal for display.

Further, in the search term recommendation system based on the multi-branch tree of the present invention, the hot term node module searches the multi-branch tree term chain data according to the inputted words comprises:

extracting the first word of the inputted words, and searching a node matched with the first word in the multi-branch tree term chain data; the residual words of the inputted words are sequentially matched with the branch nodes of the first word matching node one by one; and after all that inputted words are matched, continuing to read the remaining nodes of the term chain where all the nodes corresponding to the inputted words are located.

Further, in the search term recommendation system based on the multi-branch tree of the present invention, the step of continuing to read the remaining nodes of the term chain where all the nodes corresponding to the inputted words are located in the hot term node module comprises:

continuing to read that remaining nodes of the term chain where all the nodes corresponding to the inputted words are located until an end node is encountered, wherein the end node is a node corresponding to an end word of each hot term in the multi-branch tree term chain data generation process.

Further, in the search term recommendation system based on the multi-branch tree of the present invention, the step of taking the term chain matched with the inputted words as a recommendation term in the hot term node module comprises:

taking that term chain with the least number of node in all term chains where all the nodes corresponding to the inputted words are positioned as the recommended terms.

Further, in the search term recommendation system based on the multi-branch tree of the present invention, in the hot term node module, taking that term chain with the least number of nodes in all term chains in which all nodes corresponding to the inputted words are located as a recommendation term comprises:

combining that words correspond to all the nodes in the term chain with the least number of nodes in all the term chain where all the nodes corresponding to the inputted words are located into the recommended terms according to the matching sequence from first to last.

Further, in the search term recommendation system based on the multi-branch tree of the present invention, the hot term node module comprises a plurality of hot term node sub-modules, the hot term loading server divides the multi-branch tree term chain data into a plurality of multi-branch tree term chain sub-data according to the attribute information of the hot terms, and each hot term node sub-module corresponds to one multi-branch tree term chain sub-data;

the user gateway proxy service module selects the corresponding hot term node sub-module according to the attribute information of the first word of the inputted words, and the hot term node sub-module searches the selected multi-branch tree term chain sub-data according to the current inputted words.

Further, in the search term recommendation system based on the multi-branch tree of the present invention, the hot term loading server receives update hot terms sent by a plurality of hot term data sources, splits each update hot term into a plurality of individual words, generates an update term chain according to the first-to-last ordering of the terms in the update hot terms, and each word is a node in the update term chain, and carry out that same node fusion on each node in the updated term chain and the exits multi-branch tree term chain data to update the multi-branch tree term chain data.

Further, in the search term recommendation system based on the multi-branch tree of the present invention, if the hot term node module comprises a plurality of hot term node sub-modules, the corresponding update term chain is updated to the multi-branch tree term chain sub-data corresponding to the attribute according to the attribute information of the update hot term.

Furthermore, in the search term recommendation system based on the multi-branch tree of the present invention, the words are Chinese characters, and the attribute information is the ordering of the first letters of Chinese Pinyin corresponding to the characters.

Furthermore, in the search term recommendation system based on the multi-branch tree, the words are one or more of Chinese characters, foreign words and Arabic numerals.

The search term recommendation method and system based on the multi-branch tree have the following beneficial effects that the method optimizes the time-consuming mode of 1000 ms in the prior art to the mode of less than 1 ms by a multi-branch tree algorithm building mode, reduces the machine cost, and changes the investment of expensive high-performance servers and expensive database software into the horizontal expansion investment of public machines, and investment is optional according to data usage.

BRIEF DESCRIPTION OF THE SEVERAL VIEWS OF THE DRAWINGS

Brief description of that drawing the invention will now be further described by way of example with reference to the accompany drawings in which.

DETAILED DESCRIPTION OF THE INVENTION

For a clearer understanding of the technical features, objects and effects of the present invention, a detailed description will now be given of specific embodiments of the present invention with reference to the accompanying drawings.

Embodiment 1

Figure 1:
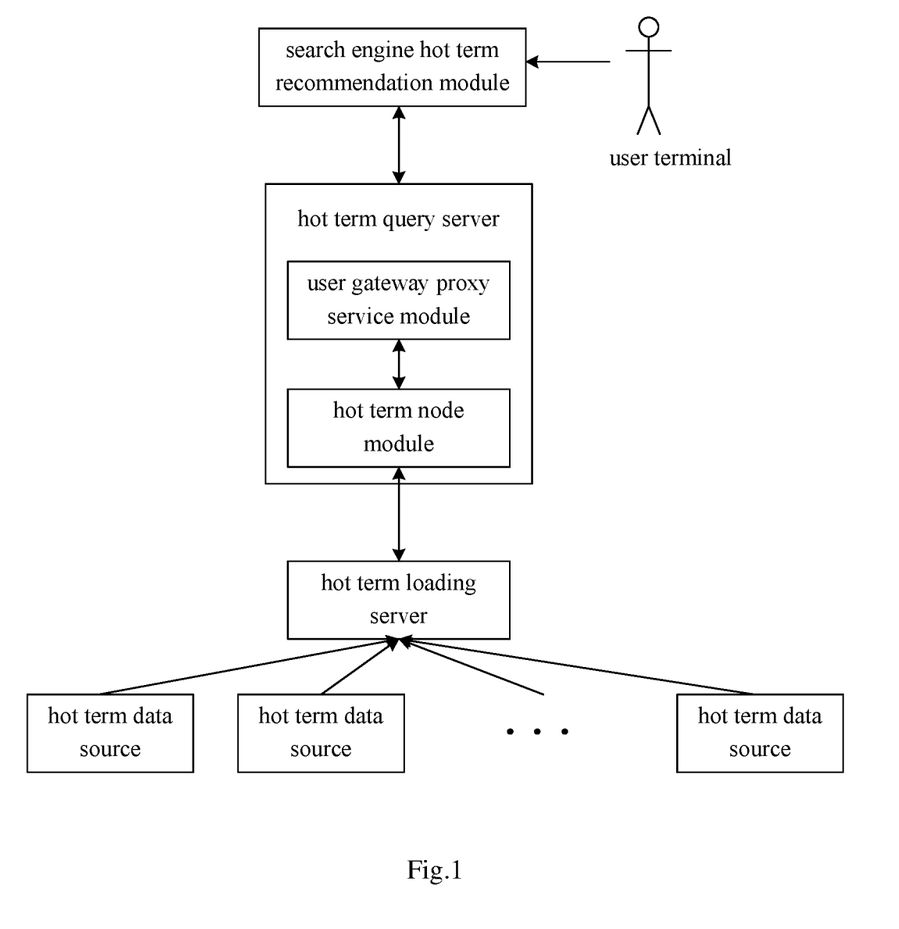
FIG. 1 is a schematic structural diagram of a search term recommendation system based on a multi-branch tree provided in Embodiment 1.
Figure 2:
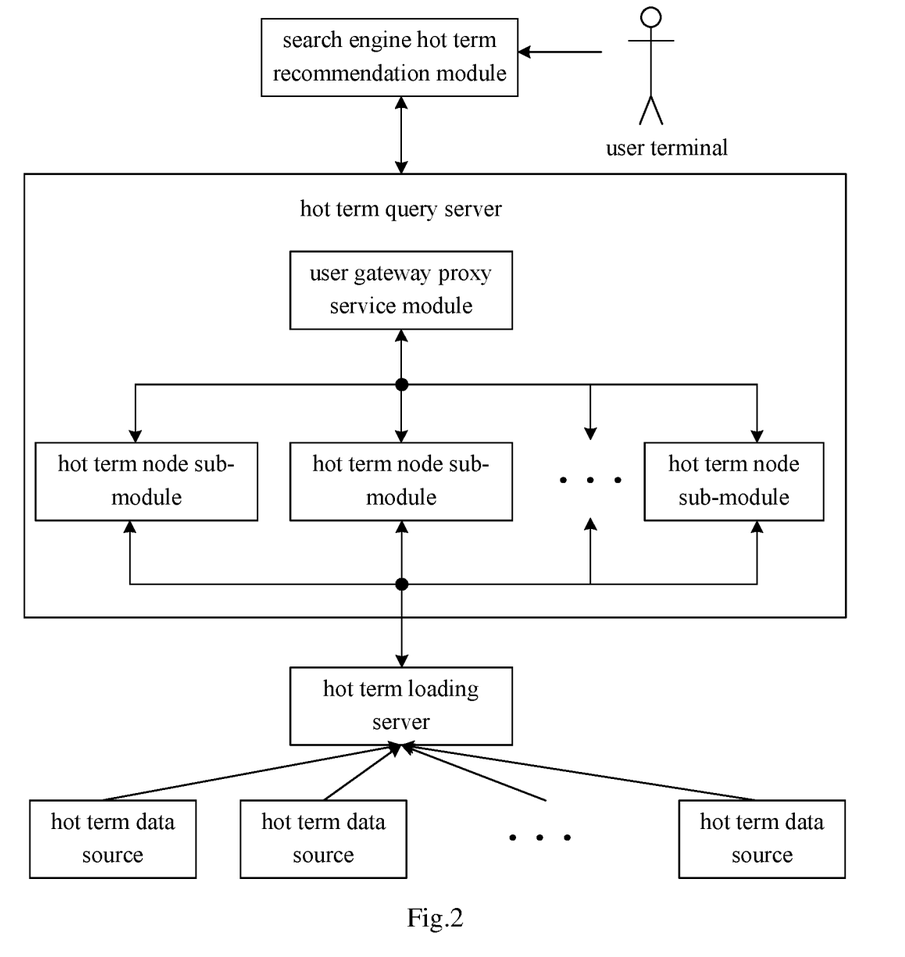
FIG. 2 is a schematic structural diagram of a search term recommendation system based on a multi-branch tree provided in Embodiment 1.
Figure 3:
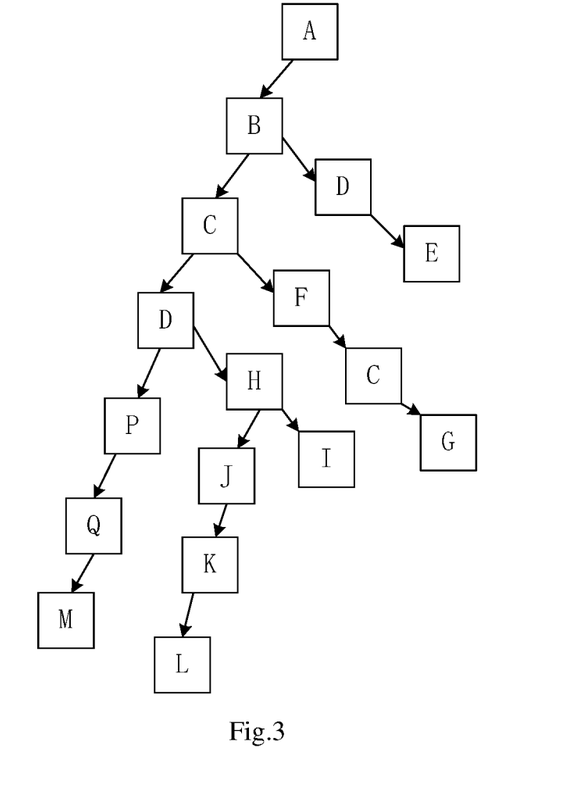
FIG. 3 is a schematic structural diagram of multi-tree term chain data provided in Embodiments 1 and 2.

Referring to FIG. 1, FIG. 2 and FIG. 3, the words in the search term recommendation system based on the multi-branch tree of this embodiment include, but are not limited to, Chinese characters, foreign language words, Arabic numerals and the like, wherein the foreign language words can be English words, French words, German words, Spanish words and the like, and the search term recommendation system based on the multi-branch tree of this embodiment can be used for the words of all languages.

The search term recommendation system based on the multi-branch tree comprises a search engine hot term recommendation module, a hot term query server, a hot term loading server and a plurality of hot term data sources, wherein the search engine hot term recommendation module is installed on a search engine of a user terminal, and the hot term query server comprises a user gateway proxy service module and a hot term node module. The search engine hot term recommendation module is in communication connection with a user gateway proxy service module, the user gateway proxy service module is in communication connection with a hot term node module, and the hot term node module is in communication connection with the hot term loading server; a hot term load server is communication connection with each hot term data source.

A hot term loading server receives hot terms sent by all hot term data sources and sends the hot terms to a hot term node module for storage, the hot term node module splits each hot term into a plurality of independent words, a term chain is generated according to the ordering of the words from first to last in the hot terms, each word is a node in the term chain, nodes corresponding to the same terms in different term chains are taken as public nodes, and generate multi-branch tree term chain data. For example, the multi-branch tree term chain data in FIG. 3 includes "ABCD", "ABDE", "CFCG", "ABCDHI", "HJKL", "MNDO", where in The term chain corresponding to the hot term "ABCD" comprises four nodes of "A", "B", "C" and "D", and the node corresponding to the word "D" is the end node of the term chain;

The term chain corresponding to the hot term "ABDE" comprises four nodes of "A", "B", "D" and "E", and the node corresponding to the word "E" is the end node of the term chain;

The term chain corresponding to the hot term "CFCG" contains four nodes of "C", "F", "C" and "G", and the node corresponding to the word "G" is the end node of the term chain;

The term chain corresponding to the hot term "ABCDHI" comprises six nodes of "A", "B", "C", "D", "H" and "I", and the node corresponding to the word of "I" is the end node of the term chain;

The term chain corresponding to the hot term "HJKL" contains four nodes of "H", "J", "K" and "L", and the node corresponding to the word "L" is the end node of the term chain, and the end node needs to be marked in the multi-branch tree term chain data.

The term chain corresponding to the hot term "MNDO" contains four nodes of "M", "N", "D" and "O", and the node corresponding to the word "O" is the end node of the term chain, and the end node needs to be marked in the multi-branch tree term chain data.

In addition, the nodes "B", "C", "D" and "H" are public nodes, which need to be marked in the multi-branch tree term chain data, and the node "D" is not only the end node, but also the public node.

The search engine hot term recommending module is used for receiving words inputted by a user and sending the inputted words to the user gateway agent service module; the user gateway agent service module sends the inputted words to the hot term node module, the hot term node module searches the multi-branch tree term chain data according to the inputted words, taking a term chain matched with the inputted words as a recommended term. The hot term node module sends the recommended terms obtained by the query to the search engine of the user terminal for display. For example, after the user inputs two words of "AB", the term chains matching with "AB" can be obtained by traversing the multi-branch tree term chain data of the above embodiments, such as "ABDE", "ABCDHI" and "ABCD".

Further, the hot term node module in the search term recommendation system based on the multi-branch tree of this embodiment searches the multi-branch tree term chain data according to the inputted words, which comprises: extracting the first word of the inputted words, and searching a node matched with the first word in the multi-branch tree term chain data; the residual words of the input words are sequentially matched with the branch nodes of the first word matching node one by one; after all of that entered text has been match, continuing to read that residual nodes of the term chain where all the nodes corresponding to the inputted words are located. For example, after a user inputs two words of "AB", the first word of "A" is firstly extracted, and the node corresponding to the word "A" is searched in the multi-branch tree term chain data of the embodiment; then the word "B" matches the branch corresponding to the node of "A", and the node corresponding to the word "B" is obtained by matching. After determining the two nodes of "A" and "B", continue to read the remaining nodes of the term chains where all the nodes corresponding to the inputted words are located, that is, determine the term chains where the two nodes of "A" and "B" are located, and in this embodiment, there are three term chain where the two nodes are located, such as "ABDE", "ABCDHI" and "ABCD".

Further, in the hot term node module in the search term recommendation system based on the multi-branch tree of this embodiment, continuing to read the remaining nodes of the term chains where all the nodes corresponding to the inputted words are located includes: continuing to read the remaining nodes of the term chains where all the nodes corresponding to the inputted words are located until an end node is encountered, and that end node is the node correspond to the end word of each hot term in the multi-branch tree term chain data generating process. In this embodiment, the end node of the term chain "ABDE" in the three term chains is the node corresponding to the word "I", the end node of the term chain "ABCDHI" is the node corresponding to the word "I", and the end node corresponding to a term chain "ABCD" is the nodes corresponding to a word "D".

In the hot term node module in the search term recommendation system based on the multi-branch tree of this embodiment, taking the term chain matched with the inputted words as the recommendation term includes: taking the term chain with the least number of nodes in all term chains where all nodes corresponding to the inputted words are located as the recommendation term. For example, the term chain "A", "B", "D" and "E" corresponds to the recommendation term "ABDE"; the commendation term corresponding to the term chain "M", "N", "D" and "O" is "MNDO".

Further, in the hot term node module in the search term recommendation system based on the multi-branch tree of this embodiment, taking the term chain with the least number of nodes in all term chains where all nodes corresponding to the inputted words are located as a recommendation term comprises: combining that words correspond to all the nodes in the term chain with the least number of nodes in all the term chain where all the nodes corresponding to the inputted words are located into the recommended terms according to the matching sequence from first to last. For example, in this embodiment, the term chains in which the two nodes of "A" and "B" are located include three terms of "ABDE", "ABCDHI" and "ABCD", wherein the term chains of "ABDE" and "ABCD" have the least number of nodes, so the term chain of "ABDE" and the term chain of "ABCD" are used as recommendation terms.

Referring to FIG. 2, the hot term node module in the search term recommendation system based on the multi-branch tree of this embodiment includes a plurality of hot term node sub-modules, and the hot term loading server divides the multi-branch tree term chain data into a plurality of multi-branch tree term chain sub-data according to the attribute information of the hot terms, and each hot term node sub-module corresponds to one multi-branch trees term chain sub-data. The user gateway proxy service module selects the corresponding hot term node sub-module according to the attribute information of the first word of the inputted words, and the hot term node sub-module searches the selected multi-branch tree term chain sub-data according to the current inputted words. The number of the hot term node sub-modules can be set according to needs, and the number of the hot terms of the search thesaurus is increased by expanding the number of hot term node sub-modules. In this embodiment, the hot term loading server and the user gateway proxy service module use the same attribute information, that is, the hot term loading server and the user gateway proxy service module use the same text distribution algorithm.

Alternatively, the hot term loading server in the search term recommendation system based on the multi-branch of this embodiment receives update hot terms sent by a plurality of hot term data sources, splits each update hot term into a plurality of individual words, generates an update term chain according to the front-to-back ordering of the terms in the update hot terms, and each word is a node in the update term chain. And fuse each node in that updated term chain with the same node of the exits multi-branch tree term chain data to update the multi-branch tree term chain data.

In the search term recommendation system based on the multi-branch tree of this embodiment, if the hot term node module includes a plurality of hot term node sub-modules, the corresponding update term chain is updated to the multi-branch tree term chain sub-data of the corresponding attribute according to the attribute information of the update hot term. Alternatively, in the search term recommendation system based on the multi-tree of this embodiment, the words are Chinese characters, and the attribute information is the order of the first letters of the Chinese Pinyin corresponding to the characters. It can be understood that the rules of words in different languages are different, and the attribute information of the words can be determined according to the ordering rules of the words in each language, and the attribute information of hot terms can be updated.

In this embodiment, by the multi-branch tree algorithm construction mode, the time consumption of 1000 ms in the prior art is optimized to be less than 1 ms, the machine cost is reduced, and the investment of expensive high-performance servers and expensive database software is changed into the horizontal expansion investment of ordinary machines, and the investment is selectable according to the data usage.

Embodiment 2

The words in the multi-branch-based search term recommendation method of this embodiment include, but are not limited to, Chinese characters, foreign language words, Arabic numerals and the like, wherein the foreign language words can be English words, French words, German words, Spanish words and the like, and the search term recommendation method based on multi-branch tree of this embodiment can be used for the words of all languages. Specifically, the search term recommendation method based on the multi-branch tree in this embodiment comprises the following steps:

A, a generation process of multi-branch tree term chain data: splitting each hot term into a plurality of independent words, generating a term chain according to that order of the words from first to last in the hot term, each word is a node in the term chain, and nodes corresponding to the same words in different term chains are taken as public nodes to generate multi-branch tree term chain data. For example, the multi-branch tree term chain data in FIG. 3 includes "ABCD", "ABDE", "CFCG", "ABCDHI", "HJKL" and "MNDO", wherein each of the letters from A to Q represents A different Chinese character and the term chain corresponding to the hot term "ABCD" comprises four nodes of "A", "B", "C" and "D", and the node corresponding to the word "D" is the end node of the term chain;

The term chain corresponding to the hot term "ABDE" comprises four nodes of "A", "B", "D" and "E", and the node corresponding to the word "E" is the end node of the term chain;

The term chain corresponding to the hot term "CFCG" contains four nodes of "C", "F", "C" and "G", and the node corresponding to the word "G" is the end node of the term chain;

The term chain corresponding to the hot term "ABCDHI" comprises six nodes of "A", "B", "C", "D", "H" and "I", and the node corresponding to the word of "I" is the end node of the term chain;

The term chain corresponding to the hot term "HJKL" contains four nodes of "H", "J", "K" and "L", and the node corresponding to the word "L" is the end node of the term chain, and the end node needs to be marked in the multi-branch tree term chain data.

The term chain corresponding to the hot term "MNDO" contains four nodes of "M", "N", "D" and "O", and the node corresponding to the word "O" is the end node of the term chain, and the end node needs to be marked in the multi-branch tree term chain data.

In addition, the nodes "B", "C", "D" and "H" are public nodes, which need to be marked in the multi-branch tree term chain data, and the node "D" is not only the end node, but also the public node.

And B, a search term recommendation process: searching multi-branch tree term chain data according to that currently inputted words, and taking term chains match with the inputted words as recommended terms.

In the search term recommendation method based on the multi-branch tree according to the embodiment, searching the multi-branch tree term chain data according to the currently inputted words comprises:

B1, extracting the first word of the inputted words, and searching a node matched with the first word in the multi-branch tree term chain data;

B2, matching the remaining words of the inputted words with the branch nodes of the first word matching node one by one in sequence;

and B3, after all that inputted words are matched, continuously reading the residual nodes of the term chain where all the nodes corresponding to the inputted words are located.

Further, in the each term recommendation method based on a multi-branch tree in this embodiment, continuously reading the remaining nodes of the term chains where all the nodes corresponding to the input words are located includes continuously reading the remaining nodes of the term chains where all the nodes corresponding to the inputted words are located until an end node is encountered, where the end node is a node corresponding to an end word of each hot term in a multi-branch tree term chain data generation process.

Further, in the search term recommendation method based on the multi-branch tree of this embodiment, taking the term chain matched with the input words as the recommendation term includes taking the term chain with the least number of nodes in all term chains where all nodes corresponding to the input words are located as the recommendation term.

Further, in the search term recommendation method based on the multi-branch tree of this embodiment, taking the term chain with the least number of nodes in all term chains in which all nodes corresponding to the inputted words are located as a recommendation term comprises: combining words corresponding to all nodes in all term chains with the least number of nodes in which all nodes corresponding to the inputted words are located as a recommendation term according to a matching order from first to last.

Alternatively, in the search term recommendation method based on the multi-branch tree of this embodiment, in the process of generating the multi-branch tree term chain data, dividing the multi-branches tree term chain data into a plurality of multi-branches tree term chain sub-data according to the attribute information of the hot term. Then searching the multi-tree term chain data according to the current inputted words including: selecting the correspond multi-branch tree term chain sub-data according to that attribute information of the first word of the input words, and searching the selected multi-branch tree term chain sub-data according to the current input word.

Alternatively, the search term recommendation method based on the multi-branch tree of this embodiment further comprises:

C, a multi-branch tree term chain data update process: splitting each update hot term into a plurality of independent words, generating an update term chain according to the sequence of the word from first to last in the update hot term, wherein each word is a node in the update term chain, and carrying out same node fusion on each node in the update term chain and the data of the existing multi-branch tree term chain so as to update the multi-branch tree term chain data.

In the search term recommendation method based on the multi-branch tree of this embodiment, in the multi-branch tree term chain data updating process, if the hot term node module includes a plurality of hot term node sub-modules, the corresponding update term chain is updated to the multi-branch term chain sub-data of the corresponding attribute according to the attribute information of the update hot term. Alternatively, in the search term recommendation method based on the multi-branch tree of this embodiment, the words are Chinese characters, and the attribute information is the order of the first letters of the Chinese Pinyin corresponding to the characters.

In this embodiment, by the multi-branch tree algorithm construction mode, the time consumption of 1000 ms in the prior art is optimized to be less than 1 ms, the machine cost is reduced, and the investment of expensive high-performance servers and expensive database software is changed into the horizontal expansion investment of ordinary machines, and the investment is selectable according to the data usage.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example components and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. A search term recommendation method based on a multi-branch tree, comprising:
   A, a multi-branch term chain data generation process: splitting each hot term into a plurality of independent words, generating a term chain according to the sequence of the words from first to last in the hot term, each word is a node in the term chain, and nodes corresponding to the same words in different term chains are used as public nodes to generate the multi-branch tree term chain data;
   and B, a search term recommendation process: searching that multi-branch tree term chain data accord to the currently inputted words, and taking a term chain matched with the inputted words as a recommended term;
   wherein the searching the multi-branch tree term chain data according to the currently inputted words comprises:
   B1, extracting the first word of the inputted words. and searching a node matched with the first word in the multi-branch tree term chain data;.
   B2, matching the remaining words of the inputted words with the branch nodes of the first word matching node one by one in sequence;
   and B3, after all that inputted words are matched. continuously reading the remaining nodes of the term chain where all the nodes corresponding to the inputted words are located.

2. The search term recommendation method based on a multi-branch tree according to claim 1, wherein the continuing to read the remaining nodes of the term chain where all the nodes corresponding to the inputted words are located comprises: continuing to read that remaining nodes of the term chain where all the nodes corresponding to the inputted words are located until an end node is encountered, wherein the end node is a node corresponding to an end word of each hot term in the multi-branch tree term chain data generation process.

3. The search term recommending method based on a multi-branch tree according to claim 2, wherein the step of taking the term chain matched with the inputted words as a recommended term comprises:
   taking that tern) chain with the least number of node in all term chains where all the nodes corresponding to the inputted words are located as the recommended terms.

4. The search term recommendation method based on a multi-branch tree according to claim 3, wherein the taking the term chain with the least number of nodes in all term chains where all nodes corresponding to the inputted words are located as a recommendation term comprises:
   combining that words correspond to all the nodes in the term chain with the least number of nodes in all the term chain where all the nodes corresponding to the inputted words are located into the recommended terms according to the matching sequence from first to last.

5. The search term recommendation method based on a multi-branch tree according to claim 1, wherein in the process of generating the multi-branch tree term chain data, dividing the multi-branch tree term chain data into a plurality of multi-branch tree term chain sub-data according to the attribute information of the hot term;
   and that step of searching the multi-branch tree term chain data according to the current inputted words comprises the following steps: selecting corresponding multi-branch tree term chain sub-data according to the attribute information of the first word of the inputted words, and searching the selected multi-branch tree term chain sub-data according to current inputted words.

6. The search term recommendation method based on a multi-branch tree according to claim 5, further comprising:
   C, a multi-branch tree term chain data update process: receiving updated hot terms sent by a plurality of hot term data sources; splitting each updated hot term into a plurality of independent words, generating an updated term chain accord to that sequence of the words from first to last in the updated hot term, wherein each word is a node in the updated term chain, carrying out the same node fusion on each node in the updated term chain and the existing multi-branch tree term chain data, and updating the multi-branch tree term chain data.

7. The search term recommendation method based on a multi-branch tree according to claim 6, wherein in the multi-branch tree term chain data updating process:
   if the multi-branch tree term chain comprises a plurality of multi-branch tree term chain sub-data, the corresponding update term chain is updated to the multi-branch tree term chain sub-data of the corresponding attribute according to the attribute information of the update hot term.

8. The search term recommendation method based on a. multi-branch tree according to claim 7, wherein the word is a Chinese character, and the attribute information is the order of the first letter of the Chinese Pinyin corresponding to the character.

9. The search term recommendation method based on a multi-branch tree according to claim 1, wherein the words are one or more of Chinese characters, foreign words and Arabic numerals.

10. A search term recommendation system based on a multi-branch tree, comprising a user terminal, a hot term query server, a hot term loading server and a plurality of hot term data sources;
    wherein the user terminal is in communication connection with the hot term query server, the hot term query server is in communication connection with the hot term loading server, the hot term loading server is in communication connection with each hot term data source;
    the hot term loading server is configured to receive all hot terms sent by the hot term data source and sends the hot terms to the hot term query server;
    the user terminal is used for receiving words input by a user and sending the inputted words to the hot term query server;

and the hot term query server is configured to split each hot term into a plurality of independent words so that a term chain is generated according to the order of the words from first to last in the hot term, each word is a node in the term chain, nodes corresponding to the same words in different term chains are taken as public nodes to generate multi-branch tree term chain data, search the multi-branch tree term chain data according to the inputted words and take a term chain matched with the input term as a recommended term, and send the recommended term obtained by query to the user terminal for display, wherein the hot term query server searches the multi-branch tree term chain data according to the inputted words comprises:

extracting the first word of the inputted words, and searching a node matched with the first word in the multi-branch tree term chain data; the residual words of the inputted words are sequentially matched with the branch nodes of the first word matching node one by one; and after all that inputted words are matched, continuously reading the remaining nodes of the term chain where all the nodes corresponding to the inputted words are located.

11. The search term recommendation system based on a multi-branch tree according to claim 10, wherein the step of continuing to read the remaining nodes of the term chain of all the nodes corresponding to the inputted words in the hot term query server comprises:

continuing to read that remaining nodes of the term chain where all the nodes corresponding to the inputted words are located until an end node is encountered, wherein the end node is a node corresponding to an end word of each hot term in the multi-branch tree term chain data generation process.

12. The search term recommendation system based on a multi-branch tree according to claim 11, wherein the step of taking the term chain matched with the inputted words as the recommendation term the hot term query server comprises:

taking that term chain with the least number of node in all term chains where all the nodes corresponding to the inputted words are positioned as the recommended terms.

13. The search term recommendation system based on a multi-branch tree according to claim 12, wherein, in the hot term query server, the step of taking the term chain with the least number of nodes among all term chains in which all nodes corresponding to the inputted words are located as a recommendation term comprises:

combining that words correspond to all the nodes in the term chain with the least number of nodes in all the term chain where all the nodes corresponding to the inputted words are located into the recommended terms according to the matching sequence from first to last.

14. The search term recommendation system based on a multi-branch tree according to claim 10, wherein and the hot term loading server divides the multi-branch tree term chain data into a plurality of multi-branch tree term chain sub-data according to the attribute information of the hot terms; and the hot term query server searches the selected multi-branch tree term chain sub-data according to the current inputted words.

15. The search term recommendation system based on a multi-branch tree according to claim 14, wherein the hot term loading server receives update hot terms sent by a plurality of hot term data sources, splits each update hot term into a plurality of individual words, and generates an update term chain according to the first-to-back ordering of the words in the update hot terms, and each word is a node in the update term chain, and each node in the update term chain is fused with the same node of the existing multi-branch tree term chain data to update the multi-branch tree term chain data.

16. The search term recommendation system based on a multi-branch tree according to claim 15, wherein if the multi-branch tree term chain comprises a plurality of multi-branch tree term chain sub-data, the corresponding update term chain is updated to the multi-tree term chain sub-data corresponding to the attribute according to the attribute information of the update hot term.

17. The search term recommendation system based on a multi-branch tree according to claim 16, wherein the words are Chinese characters, and the attribute information is the order of the first letters of the Chinese Pinyin corresponding to the characters.

18. The search term recommendation system based on a multi-branch tree according to claim 10, wherein the words are one or more of Chinese characters, foreign words and Arabic numerals.

* * * * *